United States Patent [19]

Sarugaku et al.

[11] Patent Number: 4,916,286

[45] Date of Patent: Apr. 10, 1990

[54] METHOD AND AN APPARATUS FOR CONTROLLING WORK PERFORMED BY AN AUTOMATIC WORK PROCESSING MACHINE

[75] Inventors: Shinichi Sarugaku, Funabashi; Yasunori Shimura, Chiba, both of Japan

[73] Assignees: Hitachi, Ltd., Tokyo; Hitachi Keiyo Engineering Co., Ltd., Narashino, both of Japan

[21] Appl. No.: 143,067

[22] Filed: Jan. 12, 1988

[30] Foreign Application Priority Data

Jan. 13, 1987 [JP] Japan .................................. 62-4117

[51] Int. Cl.⁴ ............................................... B23K 9/12
[52] U.S. Cl. .................. 219/124.34; 219/130.21; 901/42; 901/47
[58] Field of Search ................... 219/124.34, 130.21, 219/130.01; 901/47, 42

[56] References Cited

U.S. PATENT DOCUMENTS

| 4,219,720 | 8/1980 | Moench .................. 219/124.34 |
| 4,567,347 | 1/1986 | Ito et al. ................ 219/124.34 |
| 4,611,111 | 9/1986 | Baheti et al. ............ 901/47 |
| 4,724,302 | 2/1988 | Penney et al. ........... 219/130.21 |
| 4,733,051 | 3/1988 | Nadeau et al. .......... 219/130.01 |

FOREIGN PATENT DOCUMENTS

| 3625914 | 5/1987 | Fed. Rep. of Germany . |
| 3545158 | 6/1987 | Fed. Rep. of Germany . |
| 52-10773 | 3/1977 | Japan . |

*Primary Examiner*—Clifford C. Shaw
*Attorney, Agent, or Firm*—Fay, Sharpe, Beall, Fagan, Minnich & McKee

[57] ABSTRACT

After work is performed according to certain working parameters by an automatic work processing apparatus, the just finished work undergoes an imaging operation by use of an imaging apparatus. Outputs from the imaging apparatus are converted into binary values to obtain a line image, which is then analyzed to evaluate the finished work by comparing the binary values to reference values. If the finished work is not satisfactory, then a deviation between the binary and reference values occurs. A control system receives the deviation data and automatically changes some of the working parameters thereby attaining a satisfactory quality of the work.

18 Claims, 15 Drawing Sheets

METHOD AND AN APPARATUS FOR CONTROLLING WORK PERFORMED BY AN AUTOMATIC WORK PROCESSING MACHINE

BACKGROUND OF THE INVENTION

The present invention relates to a method of and an apparatus for controlling the work performed by an automatic work processing apparatus, and in particular, to a method of and an apparatus for controlling the of automatic work processing effected by use of robot.

With the development of automation of work processing, there has been broadly utilized a work processing in which an industrial robot is employed in various work processing fields. Welding is an example of such a work processing.

Incidentally, when perfroming the automatic welding, quality control becomes a problem in the weld processing. Various methods have already been proposed to solve this problem.

For example, the Japanese Patent Publication No. JP-B-52-10773 proposes a method wherein the position of a welding torch is controlled to weave to the right and to the left with respect to a welding path such that the same welding states appear at the right and left ends of the weaving motion, thereby attaining a satisfactory quality of the welding work. According to this method, a shift of the position of a work or workpiece as an object of the welding is allowed to some extent so as to keep the desired welding quality; however, considerations have not been given to a case where a gap exists between workpieces and to a case where the value of the welding current varies due to some external disturbance.

In addition, U.S. Pat. No. 4567347 discloses a method in which a form of an opening end of a workpiece is detected by use of a laser light so as to control a welding torch. According to this method, a shift of a position of the workpiece and a change of a gap can be coped with by modifying the processing to be achieved after the detection of the form of the opening end, which enables a satisfactory welding quality to be attained.

Considerations have not been given to cases where the final bead appearance, namely, the weld result deteriorates due to a change in the thickness of a plate associated with a fluctuation in the precision of parts or because of a variation in the welding current and/or voltage associated with an external disturbance.

The welding phenomenon is quite complex and there exist many parameters that effect the welding quality such as welding speed, a welding attitude or position, a welding current, a welding voltage, a wire supply speed, a welding power characteristic, a shield gas, a wire radius, a wire kind, a dynamic characteristic of an automatic welding machine, a plate thickness of a workpiece, a material quality of a workpiece, a shape of a joint, and a precision of the work processing apparatus.

SUMMARY OF THE INVENTION

It is therefore an object of the present invention to provide a method of and an apparatus for controlling the work quality that is capable of maintaining satisfactory work quality for any work processing performed including welding regardless of possible external disturbances which may take place in the work processing.

The object above can be achieved by evaluating the result of the work processing based on the appearance of the processed portion of a workpiece so as to reflect the evaluation result onto the control of the work processing.

In performing work processing such as welding, the appearance of the finished workpiece is considerably influenced by whether or not the work processing has been appropriately performed ; consequently, the work processing can be evaluated by checking the appearance of the finished portion. If the finished portion, immediately after the work processing is performed is subjected to image processing in realtime, the result of the work processing can be fed back to the control of the work processing apparatus, which enables the attainment of optimal processing results for all situations.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Referring now to embodiments, description will be given in detail of the method of and the apparatus for controlling the work quality according to the present invention.

Figure 1:
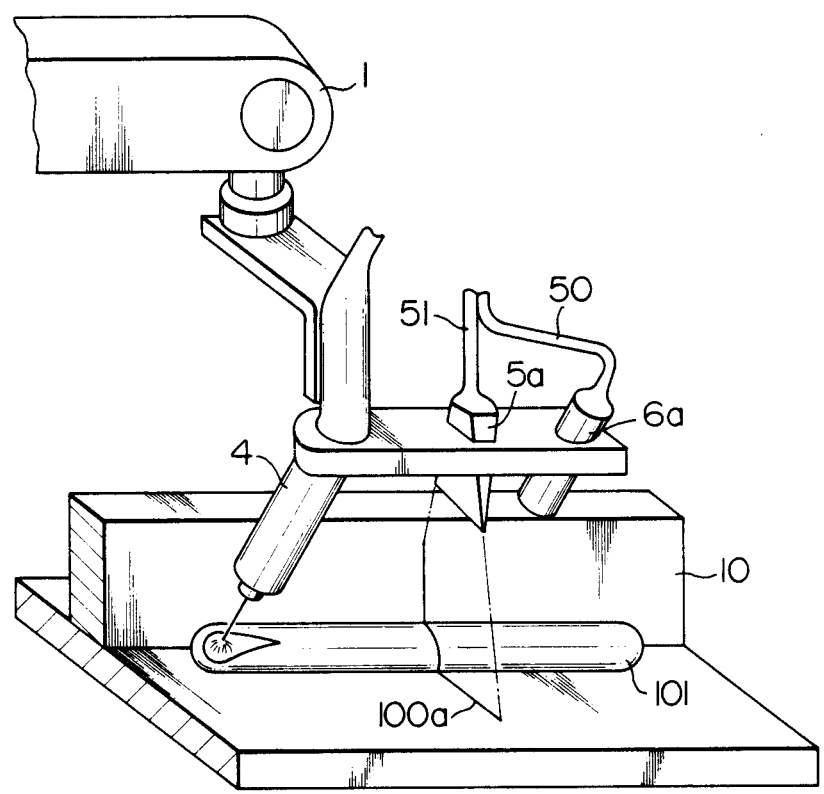
FIG. 1 is a perspective view schematically showing the neighborhood of a working section in an embodiment according to the present invention.
Figure 2:
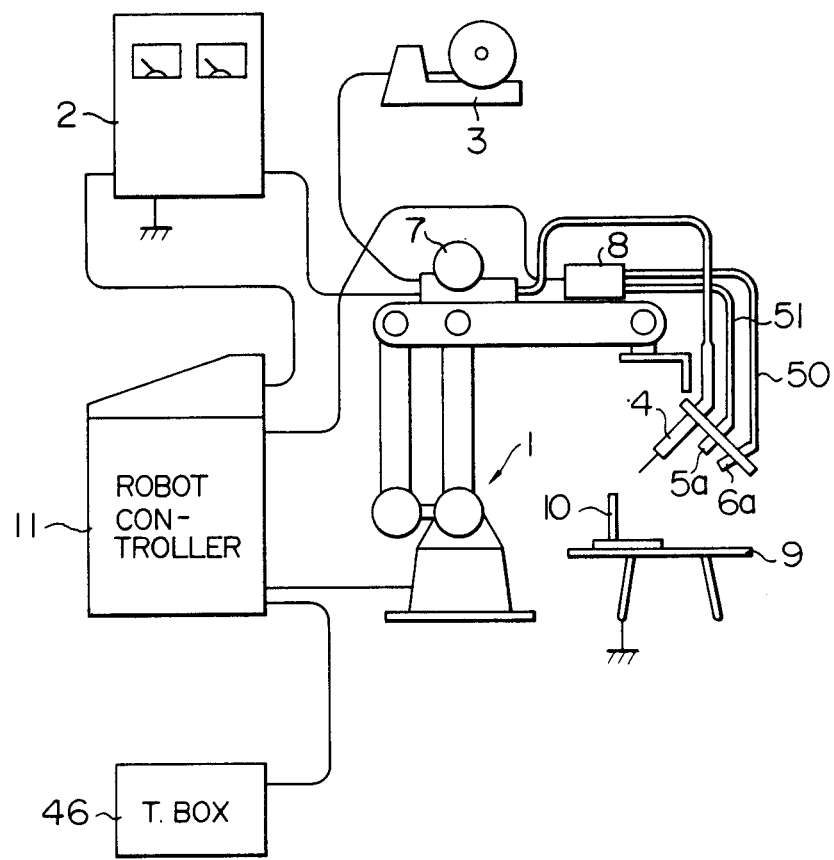
FIG. 2 is a configuration diagram schematically illustrating an overall configuration of the embodiment according to the present invention.

FIGS. 1–11 concern an embodiment according to the present invention. In this embodiment, the present invention is applied to a welding robot of a teaching/playback system and an arc welding method is employed as the welding method. In the drawings, FIG. 2 shows the overall configuration including a body of a robot 1 that is driven by five servo motors.

Reference numeral 11 designates a robot controller including therein a CPU board for controlling the robot, a CPU board for controlling sensors, and a power control unit for driving the servo motors. In the upper section of the apparatus, there are disposed a CRT for displaying data, various switches for operations such as operations to start and stop the apparatus, and an operator's panel for inputting data indicating a target welding quality.

Reference numeral 46 is a teaching box (T. BOX) used for teaching a robot in a robot work teaching operation.

Furthermore, the apparatus comprises a welding machine 2, a wire supply unit 3, and a wire transfer unit 7, which each are operated by instructions issued from the robot control unit 11.

The apparatus further comprises a welding torch 4, a work or workpiece 10, and a board 9 on which the work 10 is to be located.

Moreover, the apparatus includes a unit emitting a laser slit light 5a, a light receiving unit 6a for receiving reflected light from the light emitted from the light emitting unit 5a that is projected onto the work 10, and a control unit 8 for these components. In FIG. 2, although the light emitting section 5a and the light receiving section 6a are arranged side by side from upper left to lower right, this arrangement is shown only to illustrate the light emitting section 5a and the light receiving section 6a. In an actual arrangement, the light emitting section 5a, the light receiving section 6a, and the welding torch 4 are disposed along a line perpendicular to the surface of the drawing sheet.

Figure 3:
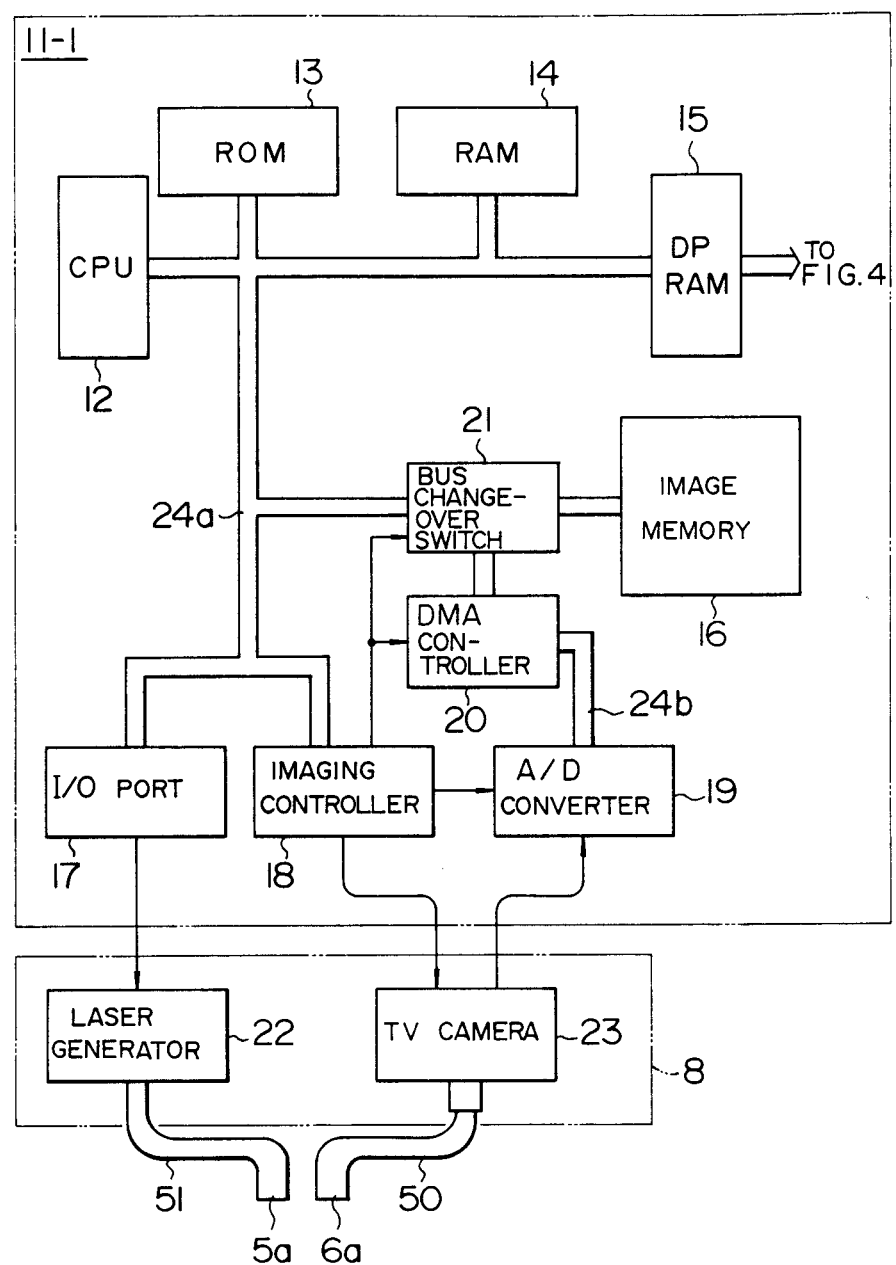
FIG. 3 is a schematic block diagram depicting a sensor control section.

FIG. 3 is a block diagram showing the respective components centered on a sensor control unit 11-1 located in the robot controller 11. This configuration includes a central processing unit (CPU) 12 to effect processing related to the sensors and feedback processing.

Reference numeral 13 is a read-only memory (ROM) in which a program indicating a processing procedure to be executed by the CPU 12 is stored.

Reference numeral 14 is a random access memory (RAM) for storing data such as an intermediate result of the processing of the CPU 12.

Reference numeral 15 indicates a dual port RAM (DP-RAM) which is accessible from the CPU of the robot controller and the CPU of the sensor controller. Information is communicated between the sensor section and the robot section through the DP-RAM 15.

Reference numeral 17 denotes an I/O port which sends in response to an instruction from the CPU 12 a laser emission instruct signal to a laser emitter 22.

Reference numeral 18 is an imaging control section which sends an instruction to the bus changeover unit 21 in response to an indication of an imaging operation from the CPU 12 so as to disconnect an image memory 16 from an internal bus 24a and then to connect the image memory 16 to an image bus 24b. Thereafter, a synchronous signal is fed to a television (TV) camera 23 and an A/D conversion instruct signal synchronized with the synchronous signal is delivered to an A/D converter 19.

The image signal digitized by the A/D converter 19 is stored in the image memory 16 at an address specified by the DMA control unit 20. Incidentally, this operation is effected for the signals equivalent to a screen, namely, the pertinent image is stored in the image memory 16.

Reference numeral 22 denotes a laser emitter and is contained in the control unit 8 together with the TV camera. A laser light emitted from this laser emitter 22 is transmitted via a light guide 51 to the light emitting section 5a. The light emitting section 5a includes a slit lens and hence a slit laser light is irradiated onto a portion where a molten metal pool is solidified or desirably where a molten metal pool has just solidified. The light is incident to a portion where the molten metal pool is considered to have just been solidified and hence is shaped into a form corresponding to a bead shape. As a result, the light associated with the image is collected by the lens of the light receiving section 6a and is then sent through an image guide 50 made of a glass fiber to the TV camera 23. Incidentally, this method is employed because a high temperature and a high electromagnetic noise are developed in the proximity of the welding torch 4.

Figure 4:
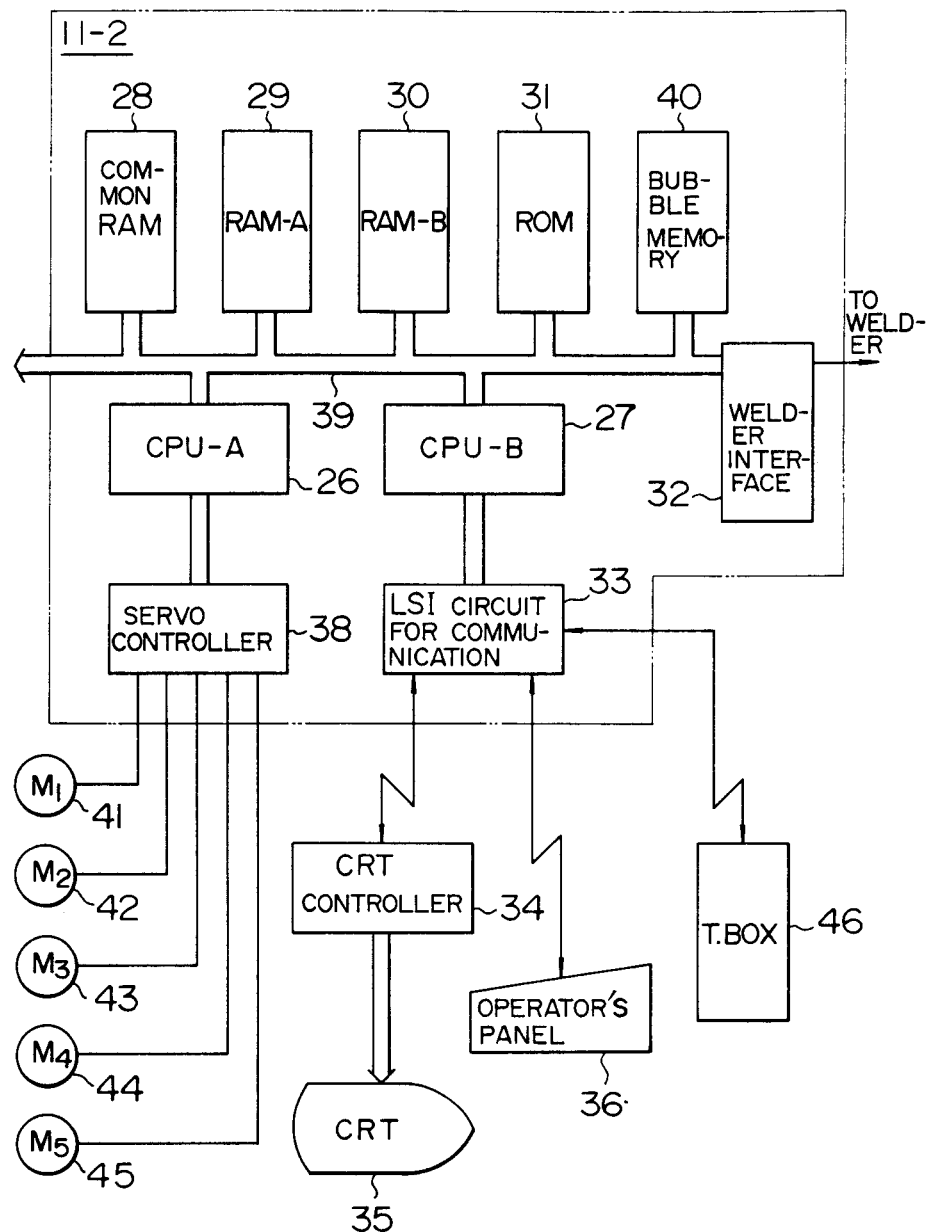
FIG. 4 is a block diagram schematically showing a robot control section.

FIG. 4 is a block diagram showing the control of the body of the robot in which reference numeral 11-2 indicates a robot control unit stored in the robot controller 11 of FIG. 2.

Reference numeral 26 indicates a CPU-A which primarily executes an operation control of the robot.

Reference numeral 27 designates a CPU-B to mainly effect processing associated with the man-machine interface.

Reference numeral 28 is a common RAM employed as a work area for information exchange and computation of the CPU-A and the CPU-B 27.

Reference numeral 29 denotes RAM-A in which a program of a processing procedure of the CPU-A 26 is stored.

Reference numeral 30 denotes RAM-B in which a program of a processing procedure of the CPU-B 27 is stored.

Reference numeral 31 is ROM to store therein a processing program which effects an initialize processing when the power is turned on to load a program from a bubble memory 40 into the RAM-A 29 and the RAM-B 30. Incidentally, the bubble memory 40 is a non-volatile external storage for storing a program and data which must not be lost even when the power is turned off.

Reference numeral 32 indicates an interface for the welding machine and operates to communicate instructions associated with a wire supply speed, a voltage, and an arc ON for the welding machine.

Reference numeral 33 is an LSI for communications. It functions as an interface between the CPU-B and the teaching box 46, the operator's panel 36, and the CRT controller 34. Incidentally, as described above, the teaching box 46 can be used for teaching the robot. The operator's panel is disposed to effect mode change-over operations for the start, stop, teaching, and playback of the robot operation and to input data indicating a target welding quality. The CRT controller 34 enables the display of various the information on the CRT 35 based on information sent from the communication LSI 33.

The servo controller 38 controls, according to data fed from the CPU-A, the respective servo motors $M_1$-$M_5$ designated as 41–45, respectively.

As described above, in the embodiment, when the robot is operated in the teaching and playback system, namely, when a sensor control is specified by a teaching operation, a control program related to the sensor circuit is initiated.

Figure 5A:
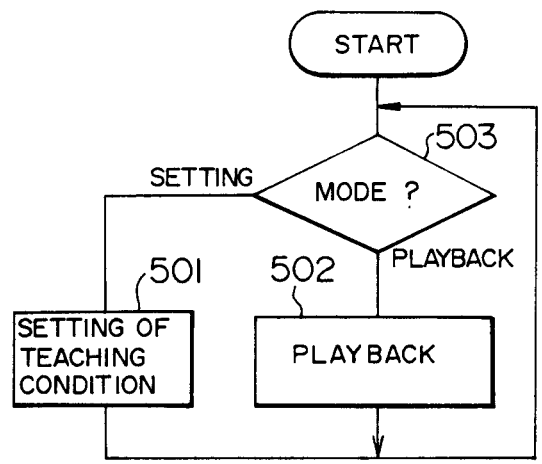
FIGS. 5A–5B and 6 are flowcharts useful to explain the welding operation.

FIG. 5A is a flowchart of operations associated with a teaching mode 501 and a playback mode 502. Mode 503 is selected according to the switch on operator's panel 36. A work condition and a route of the robot are instructed in the teaching mode 501.

Figure 5B:
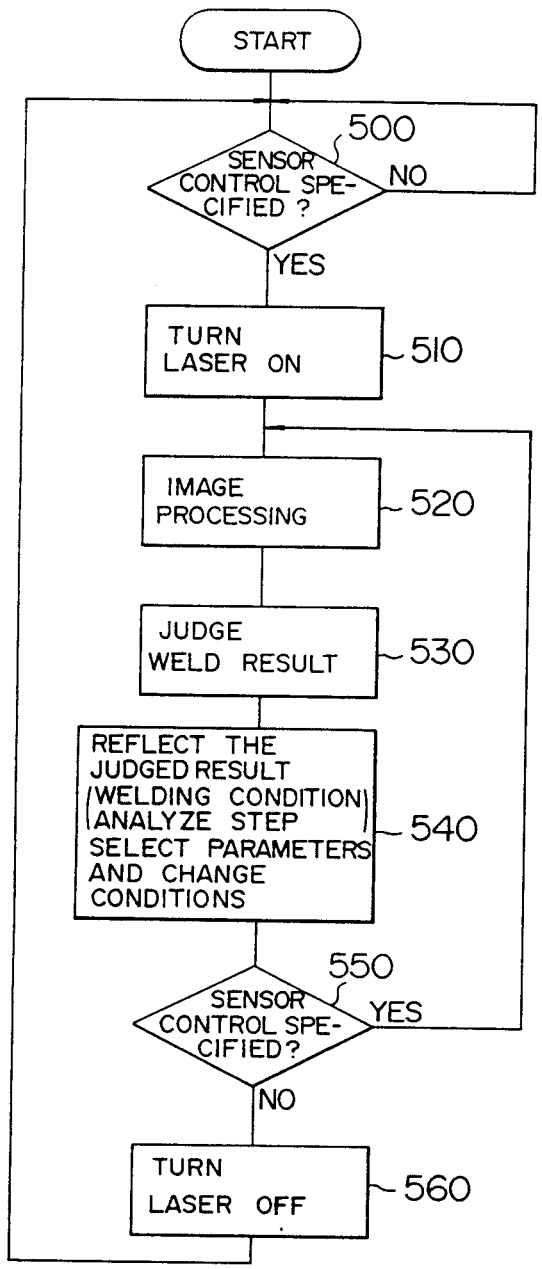

Next, referring now to FIG. 5B showing the operation in the playback mode 502, description will be given of operations centered on the sensors and related components.

FIG. 5B is a flowchart showing the contents of CPU 12 described in conjunction with FIG. 3. When the processing is started, a processing step 500 waits for a specification of a sensor control.

In this situation, the specification of a sensor control is fed from the robot controller 11-2. If the sensor control specification is present, a processing step 510 initiates an emission of laser light. A processing step 520 effects an image processing for the emitted laser light. A processing step 530 judges the result of the image processing of the processing step 530 and then a processing step 540 reflects the image processing result onto the side of the robot (including the welding machine). These three processing steps will be described in more detail later in this text.

A processing step 550 judges whether or not the sensor control is specified. If this is the case, the processing is repeated beginning from the processing step 520; otherwise, a processing step 560 turns the laser light off and passes control to the processing step 500, where the system waits for another sensor control specification.

Next, a description will be given of operation in the primary sections, for example, the image processing.

FIG. 1 shows a state in the proximity of the welding torch 4 when a laser beam is irradiated from the laser emitting section 5a. Namely, the light emitting section 5a includes a slit lens as described above and hence a slit light is emitted therefrom. The slit light thus emitted is radiated onto the welding bead portion 101 and the work 10 and then forms a line 100a (a slit light image) reflecting the external shape or contour of the welding bead portion 101.

Figure 6:
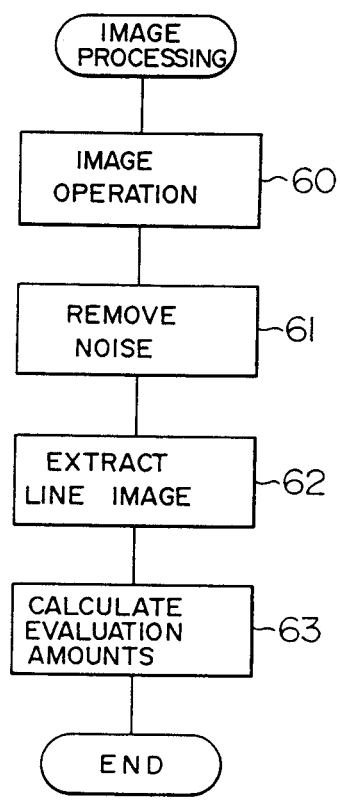
Figure 7:
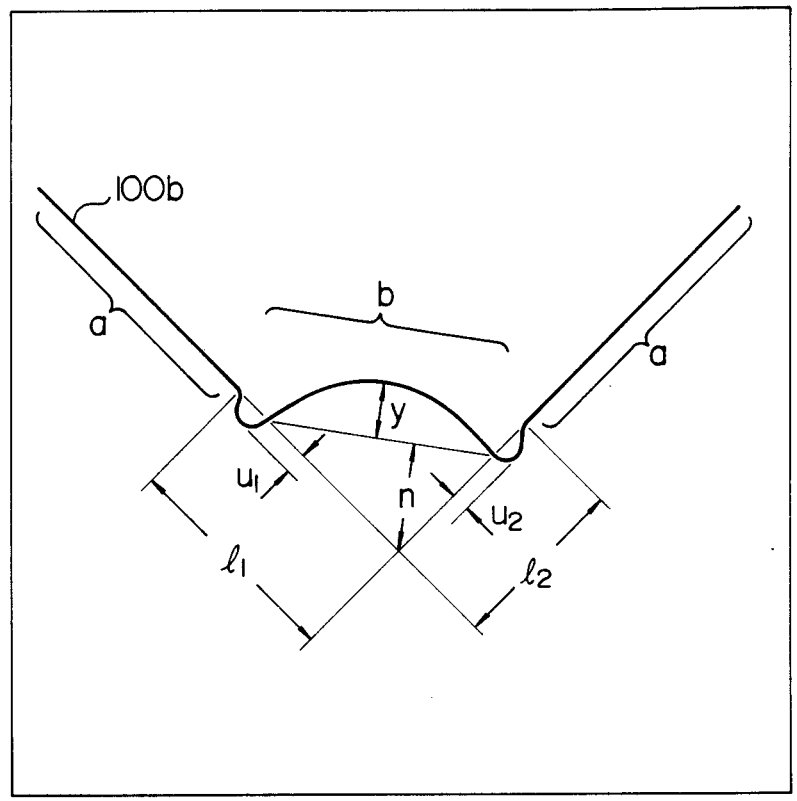
FIGS. 7–11 are explanatory diagrams useful to explain optical cut-away images for respective evaluations.

When the optical cut-away image is viewed from a direction inclined with respect thereto by means of a lens of the light receiving section 6a, the image is seen as an image indicated by reference numeral 100b in FIG. 7, where portions a are surfaces of the work 10 and a portion b corresponds to the outer shape of the welding bead portion. Incidentally, although omitted in FIG. 7, since image data actually attained from the TV camera 23 contains noise, as shown in FIG. 6, after an image is shot by the TV camera 23 in a processing step 60, a processing step 61 first removes the noise, and a processing step 62 searches for bright portions in the screen so as to connect the obtained portions to extract a line 100b of FIG. 7. In a processing step 63 of FIG. 6, the evaluated amounts of the line 100b are calculated, where the evaluated amounts include the following items shown in FIG. 7.

y: Reinforcement
n: Throat depth
$l_1$, $l_2$: Left and right leg lengths
$u_1$, $u_2$: Left and right undercut Moreover, although not shown in FIG. 7, there exists a phenomenon of an overlap ($O_1$, $O_2$) of which the values are outputted in millimeters. Incidentally, these amounts conform to the reference associated with the judgement of the weld appearance assigned to the ordinary welding work.

Returning now to FIG. 5, when the processing above is accomplished by the processing step 520, the next processing 530 judges the result of the welding operation.

The operator, in this situation, beforehand inputs from the operator's panel 36 (FIG. 4) correction rules to be applied when an abnormality appears in the error allowances of the respective reference values and the obtained values. In this embodiment, the following reference values and rules are employed.

Reinforcement $Y_0 = 1$ mm (reference) ± 0.3 mm (allowable error)

Throat depth $n_0 = 7.5$ mm (reference) ± 0.5 mm (allowable error)

Leg length $l_0 = 6$ mm (reference) ± 1 mm (allowable error)

Undercut $u_0 = 0$ mm (reference) ± 0.1 mm (allowable error)

Overlap $o_0 = 0$ mm (reference) ± 0.1 mm (allowable error)
Group of rules

Rule 1

If there exists a great reinforcement, then lower welding current is provided.

If there exists a small reinforcement, then the welding current is increased.

Rule 2

If there exists a great throat depth, then the welding speed is increased.

If there exists a small throat depth, then the welding speed is decreased.

Rule 3

If there exists a large value of an average of the leg lengths, then the welding speed is increased.

If there exists a small value of an average of the leg lengths, then the welding speed is decreased.

Rule 4

If the left leg is lower than the right leg, then the target position is shifted to the right.

If the left leg is shorter than the right leg, then the target position is shifted to the left.

Rule 5

If there exists a great undercut, then lower welding voltage is provided.

Rule 6

If there exists a great overlap, then the welding voltage is increased.

In short, five reference values and six rules apply to this welding work; however, another arbitrary combination of rules may also be employed. These values are beforehand stored in the DP-RAM 15 by means of the CPU-B 27.

Figure 8:
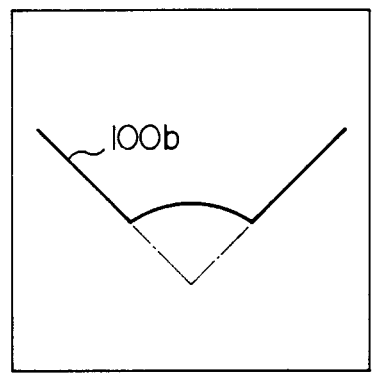

As a result, if the line 100B is drawn, for example, as shown in FIG. 8, since the values are within the allowable error ranges of the respective reference values, the processing step 540 of FIG. 5 does not any information to the robot control unit.

Figure 9:
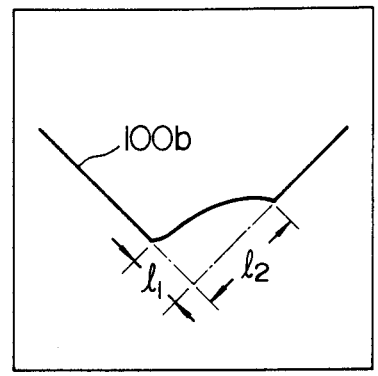

On the other hand, when the line 100b is attained as shown in FIG. 9, $l_1 > l_2$ and both of $l_1$ and $l_2$ are out of the allowable error range, Article 2 of the rule 4 is applied such that an instruction is issued to the robot to shift the target position to the left.

Figure 10:
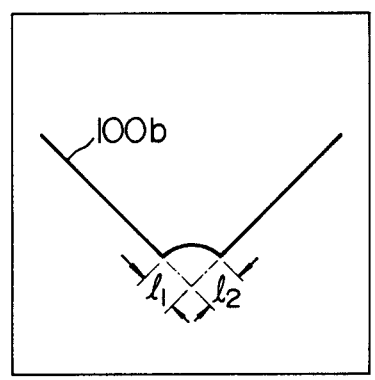

Furthermore, in a case of FIG. 10, since the average value of $l_1$ and $l_2$ is smaller than 6 mm and is out of the allowable error range, Article 2 of the rule 3 is applied so as to issue an instruction to the side of the robot to reduce the welding speed.

Figure 11:
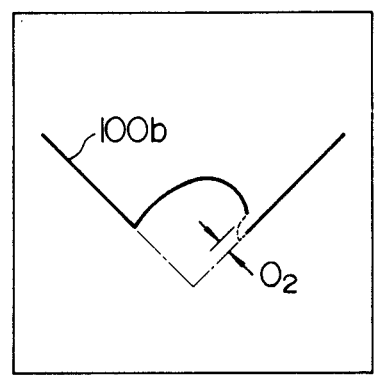

In a case of FIG. 11, an overlap has appeared ($\theta_2 > 0.1$) and hence the rule 6 is selected and an instruction is sent via the robot control unit to the welding machine to increase the voltage.

Consequently, according to the embodiment above, in both cases of FIGS. 9–10, the causes of the phenomena need not be confined, namely, there is obtained an effect that a satisfactory welding result is attained in any cases without changing the pertinent condition.

Moreover, since the operator can arbitrarily set various rules, for example, in an application where an operation to minimize the welding time takes precedence, there is attained an effect that the condition can be processed by changing Article 2 of the rule 2 to "Increase the welding current" or "Raise the torch".

Incidentally, the evaluation result may only be recorded, i.e. the resultant data is not outputted to the side of the robot. In this case, it is natural that the recorded evaluation result data can be used in an inspection process of the welding result.

Figure 12:
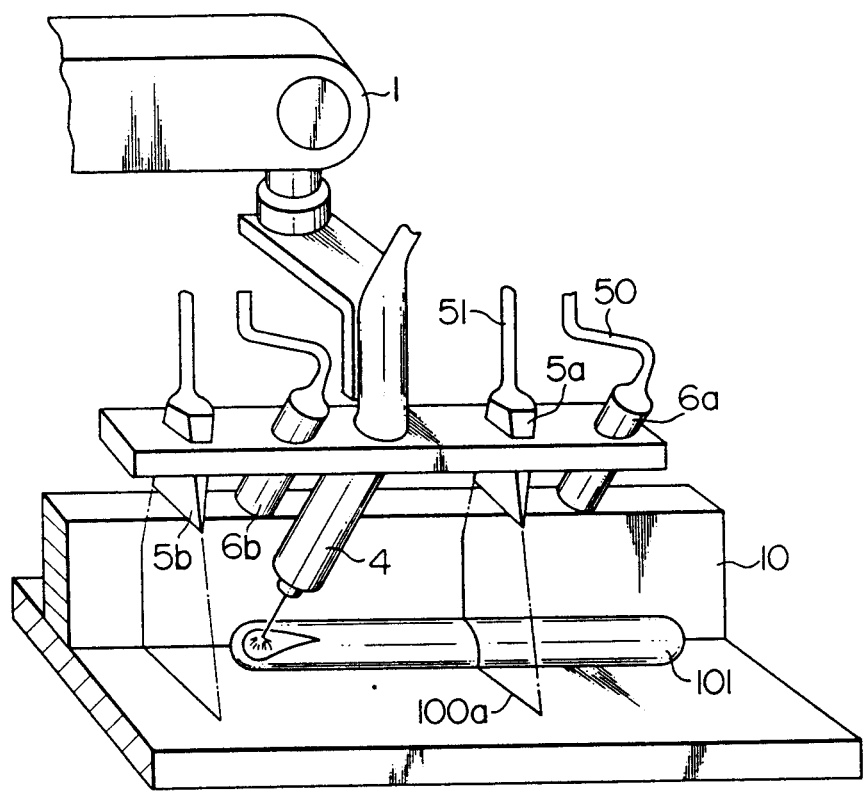
FIG. 12 is a perspective view showing the neighborhood of a working section according to another embodiment of the present invention.
Figure 13:
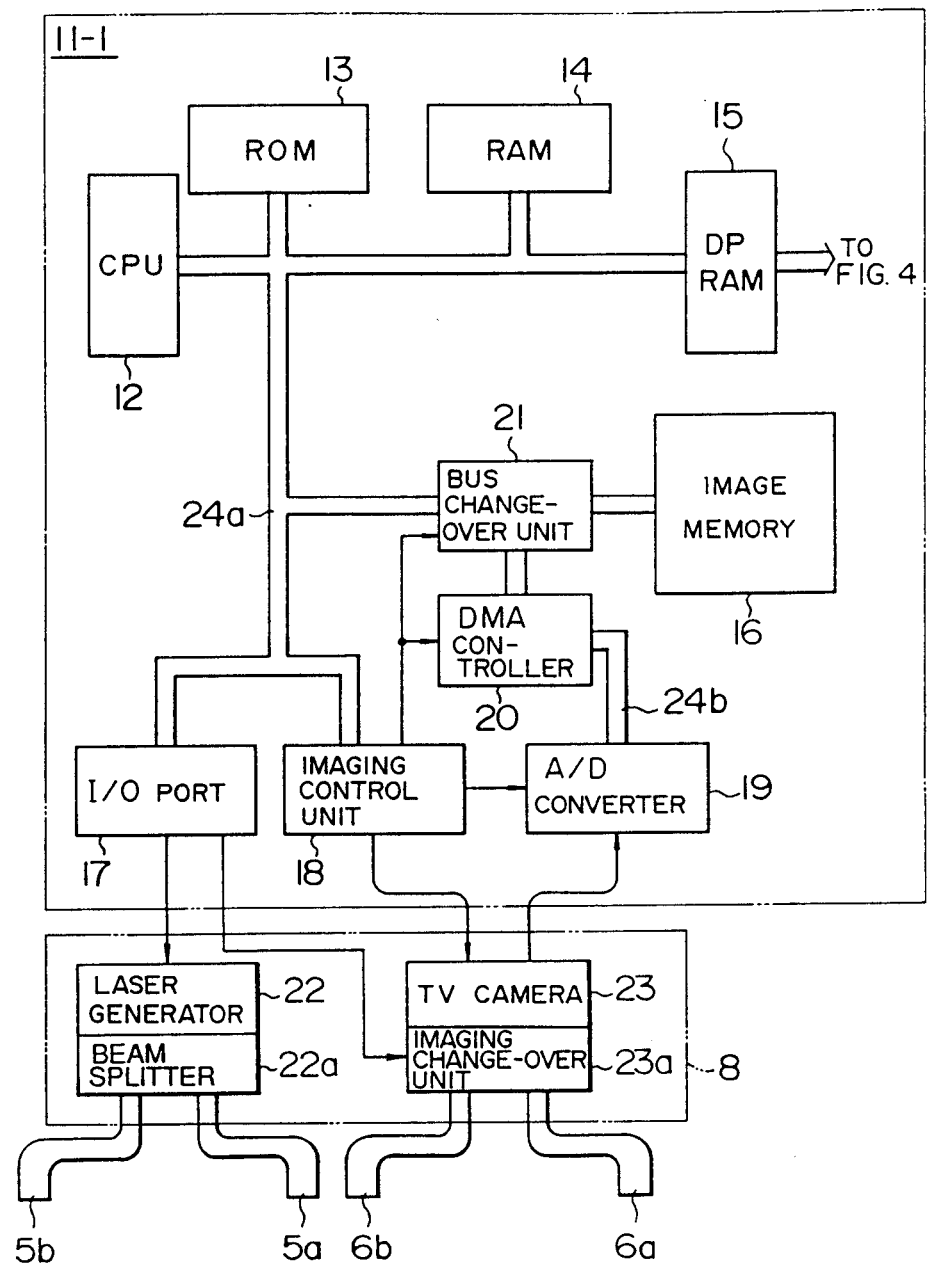
FIG. 13 is a schematic block diagram depicting a sensor control section of the embodiment of FIG. 12.
Figure 14:
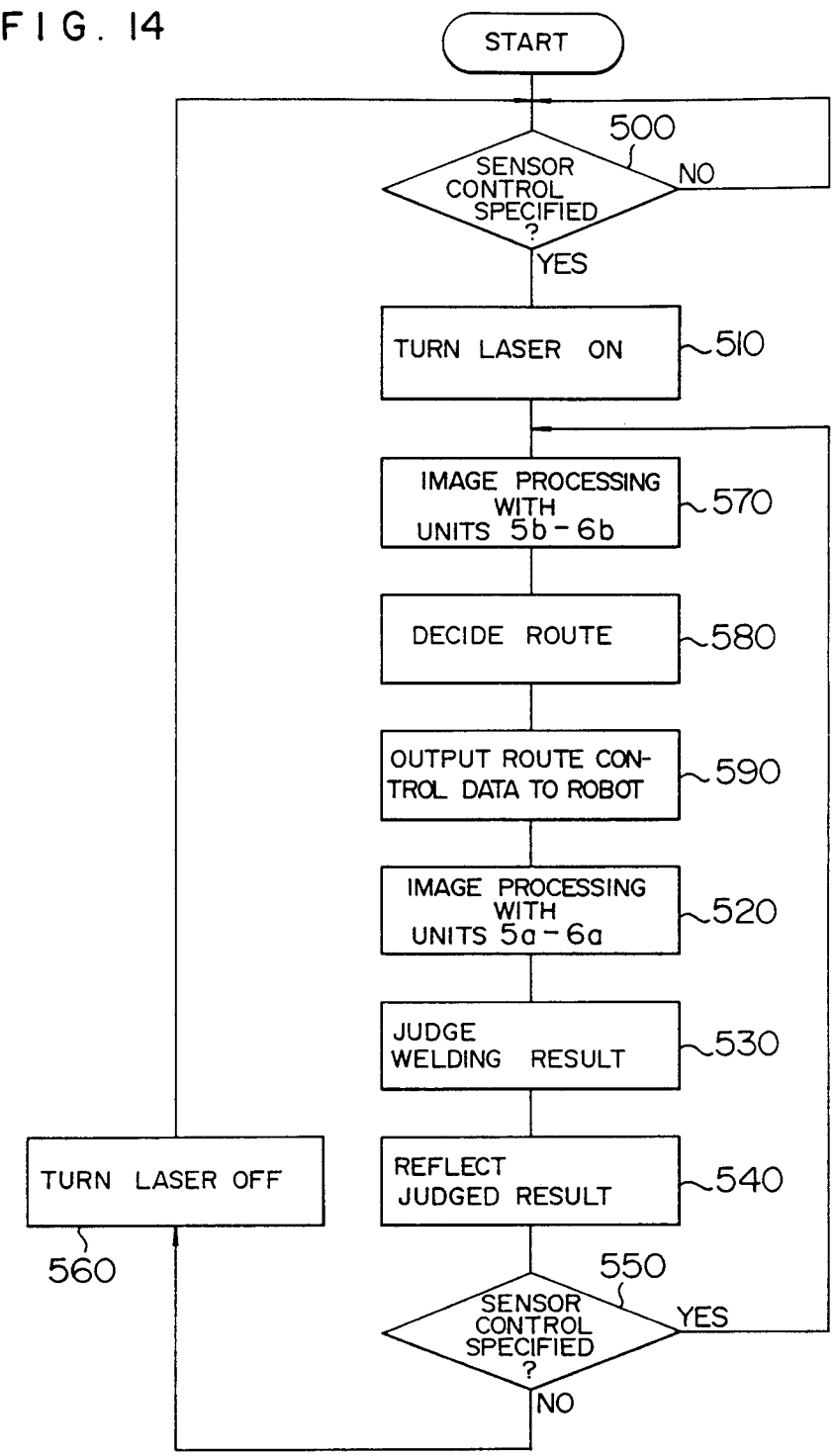
FIG. 14 is a flowchart useful to explain the welding operation of the apparatus of FIG. 12.

FIGS. 12–14 are diagrams showing another embodiment according to the present invention, which is different from the embodiment described above in that a light emitting section 5b and a light receiving section 6b are also arranged before the welding torch 4. The light emitting section 5b and the light receiving section 6b are utilized to detect a position to which the torch 4 is moved.

A light is irradiated from the light emitting section 5b onto a portion surrounding a location to be welded and then a reflection of the light thereof is received by the light receiving section 6b so as to determine an accurate position to be welded. Since the technology of this kind has already been dislosed in JP-B-50-33874, a detailed description will not be given in this text.

Incidentally, a laser emitter and a TV camera are expensive; consequently, in the embodiment of FIG. 13, a beam splitter 22a is disposed between a laser emitter 22 and the light emitting sections 5a–5b and an imaging change-over switch 23a is arranged between a TV camera 23 and the light receiving sections 6a–6b. In addition, in a case where a sensor control specification is detected to be present as a result of the judgement in the step 500 as shown in FIG. 14, step 510 turns the laser beam on, step 570 obtains an image in the neighborhood of a location to which the torch is to be moved by means of the light emitting section 5b and the light receiving section 6b, step 580 decides a route to be taken, and step 590 reflects the results of the decision onto the route control of the robot. The subsequent operations are effected as shown in FIG. 5B, namely, steps 520, 530, 540, and 550 are executed and then control proceeds to step 560 or 570. Consequently, the TV camera is accordingly utilized in a time sharing fashion.

Next, a description will be given of the embodiment of FIGS. 15–21 of the present invention wherein a sealing agent is applied to a workpiece for a sealing purpose.

Figure 15:
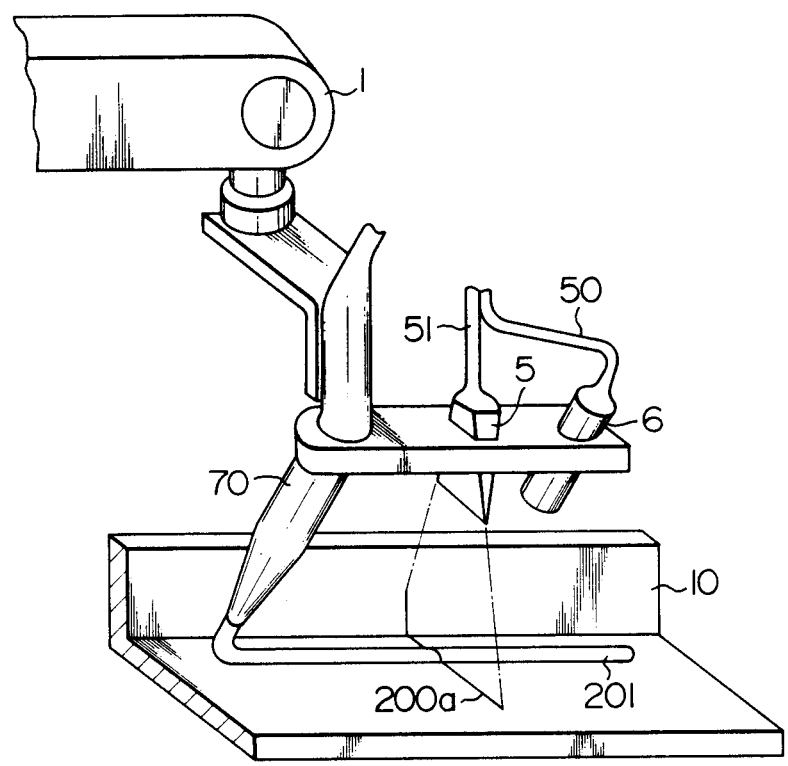
FIG. 15 is a perspective view illustrating the neighborhood of a working section in a further embodiment according to the present invention.

Also in this embodiment, like in the embodiment above for the welding work, a robot operating in the teaching/playback system is employed to apply a sealing agent in which, as shown in FIG. 15, a nozzle 70 for ejecting a sealing agent is used to apply a sealer 201 so as to form a predetermined shape in a predetermined location of a work 10. For this purpose, in place of the torch 4 in the case of the embodiment described above in conjunction with FIGS. 1–11, there is disposed the nozzle 70. As a result, although not shown in the diagram, units such as a pump to supply the sealing agent to the nozzle 70 are arranged in place of the welding machine 2 and the wire supply unit 3. The other components are not changed. Incidentally, in the configuration of FIG. 15, reference numeral 200a represents a line or a slit light image formed by a laser beam irradiated from the light emitting section 5 onto the sealer 201 (the bead of the sealing agent ejected from the nozzle 70 on the surface of the work 10).

Incidentally, since the sealing work (to coat the sealing agent) of this embodiment is accomplished for a purpose of waterproofing, evaluations such as "the sealer is not coated" or "the amount of sealer applied is insufficient" is important with respect to the evaluation references of the result of the sealing work.

On the other hand, the sealing agent employed must have a high viscosity, which is however changed with a variation in the temperature of the sealing agent.

Consequently, even if the sealing agent is supplied to the nozzle 70 under a constant pressure, the amount of the sealing agent ejected from the nozzle 70 varies depending on the temperature change associated with the seasons.

As a result, it is quite important to cope with such a change of the ejected sealing agent and to form a predetermined shape of the sealer with a high stability for all cases.

On the other hand, the position where the sealer 201 is formed may not need to be so accurately determined as compared with the case of the welding work.

Based on the considerations above, the operation of the embodiment of FIG. 15 will be described.

First, the robot control and the image processing are almost identical to those of the embodiment of the welding work described in conjunction with FIGS. 1–11. There exist, however, points of difference, namely, the welding result judgement processing step 530 of FIG. 5B is replaced with a sealing result judgement processing step and the contents of the evaluation amounts to be calculated are different from the computation of the evaluation amounts of the processing step 63 of FIG. 6. In addition, as another difference, since the sealing work can be achieved in general at a high speed as compared with the welding work, the overall processing speed is also devised to be increased in association with this condition.

Figure 16:
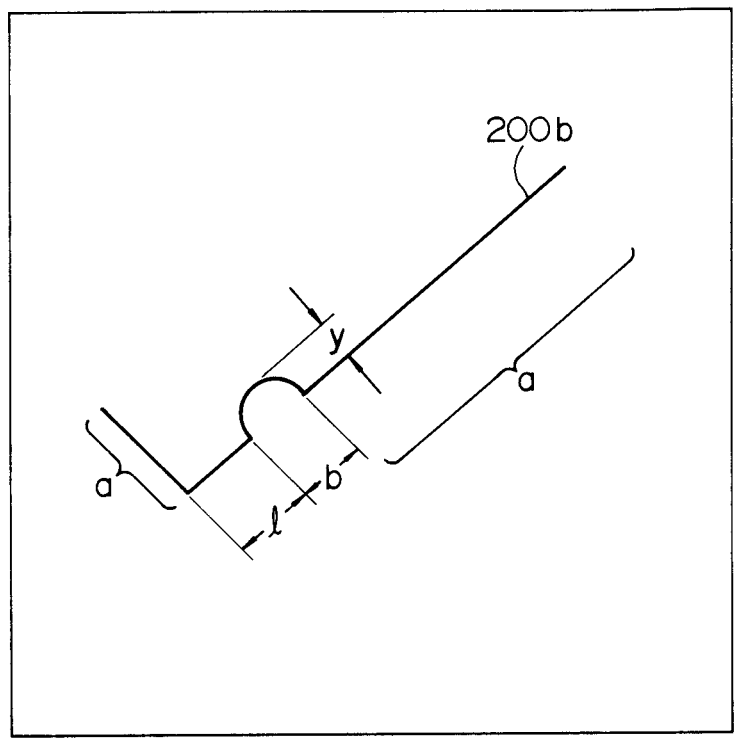
FIG. 16 is an explanatory diagram useful to explain an optical cut-away image.

In the processing of FIG. 6, after the line image of the processing step 62, the calculation processing 63 of the evaluation amounts is effected to calculate the following values.

l: Distance from a wall surface to a sealer end
b: Width of sealer
y: Height of sealer Incidentally, these items are indicated as shown in FIG. 16 by means of the slit light image of the line 200a (FIG. 15), where reference numeral 200b denotes the slit light image.

Figure 17:
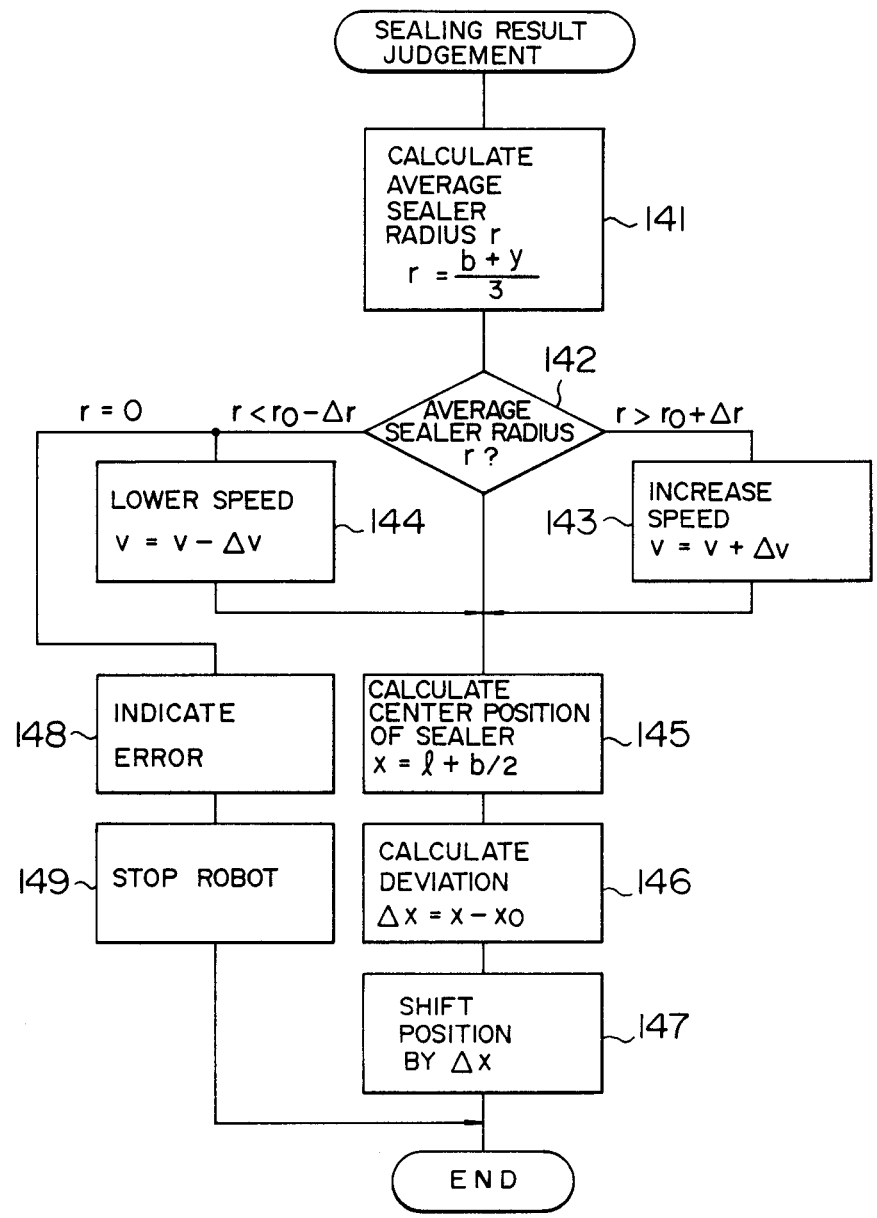
FIG. 17 is a flowchart useful to explain the welding operation.

Referring next to FIG. 17, a description will be given of the judgement processing of the sealing result in this embodiment.

The processing of FIG. 17 is executed in place of the processing step 530 of FIG. 5B. First, a processing step 141 is effected to attain an average sealer radius as follows.

$$r = (b + y)/3$$

Next, a processing step 142 compares the average sealer radius r with the reference sealer radius $r_0$. If the sealer radius r is greater than the reference value $r_0$ at least by the allowable error $\Delta r$, a processing step 143 is achieved to increase the sealing speed (the moving speed of the nozzle 70) by $\Delta v$; on the other hand, if the value r is less than $r_0 - \Delta r$, a processing step 144 is executed to decrease the sealing speed by $\Delta v$. In a case of $r = 0$, since this condition means that the sealing agent is not ejected from the nozzle 70, a processing step 148 displays an error and then a processing step 149 stops the robot.

Consequently, no action is taken if the value r is within the allowable error range of the value $r_0$.

Next, in the processing step 145, the central position of the sealer 201 is attained as follows.

$$x(\text{central position}) = l + \frac{b}{2}$$

Thereafter, the processing step 146 calculates a deviation $\Delta x$ from the target position $x_0$ of the central position x and the processing step 147 then shifts the target position (route) of the nozzle 70 according to the value of $\Delta x$ (i.e. the value is multiplied by a preset constant and the resultant value is supplied to the robot).

Referring next to FIGS. 18–21, a concrete example will be described.

Figure 18:
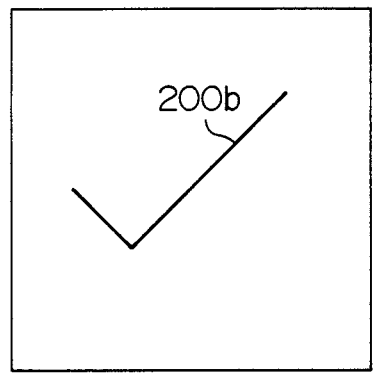
FIGS. 18–21 are explanatory diagrams useful to explain optical cut-away images, respectively.
Figure 19:
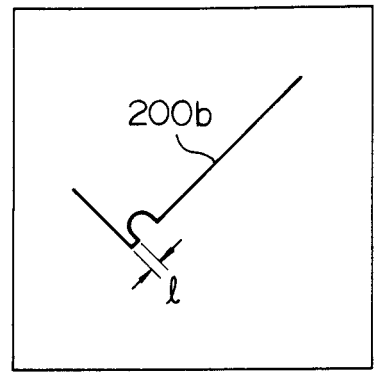

First, in FIG. 18, the sealing agent is not coated and hence an error occurs, which causes the robot to stop the operation thereof. Next, in FIG. 19, the position of the sealer is dislocated and consequently a positional correction is achieved toward the right.

Figure 20:
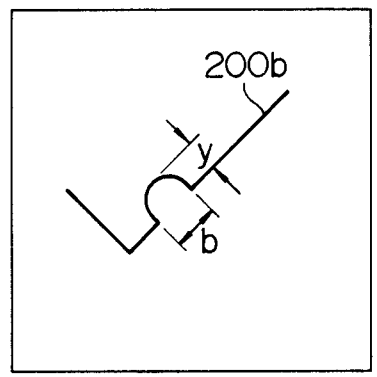

Moreover, in FIG. 20, the radius of the sealer is excessive and hence the sealing speed is increased. Incidentally, in this situation, the amount of the sealing agent supplied may also be reduced in place of the operation to increase the sealing speed.

Figure 21:
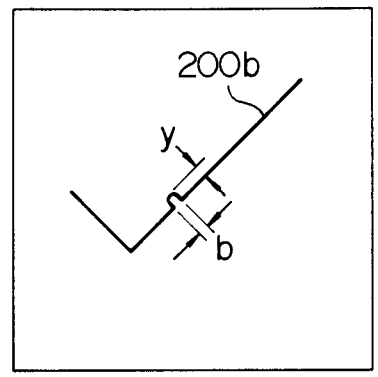

Finally, FIG. 21 shows a case where the radius of the sealer is too small. The sealing speed here is lowered. Also in this case, the amount of the sealing agent supplied may be increased.

As described above, according to the present embodiment, there can be accomplished a satisfactory sealing operation under any conditions.

Incidentally, although an error is assumed to stop the robot when the sealing agent is not coated in this embodiment, it is naturally possible to retrace the route of the sealing operation so as to effect the sealing operation beginning from a location where the normal sealer is found.

Furthermore, in the embodiment above, although the width b and height y of the sealer (FIG. 16) are employed to evaluate the seam, this is achieved to increase the processing speed; consequently, if the condition of the processing speed is not critical, it is of course desirable to calculate a cross-sectional area S of the sealer as the evaluation amount.

Incidentally, in these embodiments, although an imaging operation is accomplished on a work processing portion by means of a slit light, this is effected to facilitate the processing of image data. As a consequence, in a case where the image data processing is not critically restricted or where a high-speed processing is possible, it is natural that a general illumination light may also be utilized in place of the slit light.

While the present invention has been described with reference to the particular illustrative embodiments, it is not restricted by those embodiments but only by the appended claims. It is to be appreciated that those skilled in the art can change and modify the embodiments without departing from the scope and spirit of the present invention.

We claim:

1. A work state analysis method for a system in which a tool is moved by use of an operating means along a predetermined work route along a workpiece according to a plurality of work conditions so as to perform a predetermined sequential work processing on the workpiece, comprising:

a step of imaging a surface of a portion of the workpiece that has undergone the sequential work processing after the work processing has subsequently stabilized along a line to obtain a line image having a shape of a contour of the surface of the workpiece in association with a movement of the tool, and converting said line image into electrical signals;

a step for generating a plurality of binary data characteristic of said shape of said line image from said electrical signals attained from said imaging step; and a judging step for analyzing the data resulting from the binary characteristic data generating step so as to judge whether the work conditions affecting a finished state of the work are in accordance with predetermined values.

2. A method of controlling work processing, comprising:

performing the work processing automatically with a work processing apparatus in accordance with control commands in a sequential fashion along a predetermined fixed route on a surface of a workpiece;

imaging an area of a workpiece surface to obtain a line image having a shape of a contour of the workpiece surface where the work processing has been performed and has subsequently stabilized, and converting said image into electrical signals including data concerning conditions in said area;

extracting a plurality of data characteristic of said shape of said line image from said electrical signals, said characteristic data being representative of results of said work;

comparing said extracted characteristic data with corresponding reference values representative of predetermined and desired conditions of work in said area, and detecting deviations between said characteristic data and said reference values; and changing said control commands in accordance with the detected deviations in a direction such that said characteristic data approaches said reference values.

3. A method of controlling work processing, comprising the steps of:

performing predetermined work processing automatically with a work processing apparatus in accordance with control commands in a sequential fashion along a route on a surface of a workpiece while said route is being determined;

imaging an area of a workpiece surface to obtain a line image having a shape of a contour of the workpiece surface where the work processing of the work has been performed and has subsequently stabilized, and converting said image into electrical signals including data concerning conditions in said area;

extracting a plurality of data characteristic of said shape of said line image from said electrical signals, said characteristic data being representative of the result of said work;

comparing said extracted characteristic data with corresponding reference values representative of predetermined and desired conditions of work in said area, and detecting deviations between said characteristic data and said reference values; and changing said control commands in accordance with the detected deviations in a direction such that said characteristic data approaches said reference values.

4. A method for welding two workpieces together with a welding torch, comprising the steps of:

controlling the movement of a welding torch along a line connecting the two workpieces together in accordance with control parameters;

setting a plurality of the control parameters to effect the result of the welding on the two workpieces;

imaging an area of said connecting line to obtain an image having a shape of a contour of said area where the welding has been performed and has left a molten pool that has subsequently solidified, and converting said image into electrical signals including data concerning conditions in said area;

extracting a plurality of data characteristic of said shape of said image from said electrical signal, said characteristic data being representative of results of the welding on said welding line;

comparing said extracted characteristic data with corresponding reference values representative of predetermined desired conditions of welding in said area, and detecting deviations between the characteristic data and the reference values; and changing said control parameters according to the detected deviations in a direction such that said characteristic data approaches said reference values.

5. A method for welding two workpieces together with a welding torch, comprising the steps of:

controlling the movement of a welding torch along a line connecting the two workpieces together in accordance with control parameters;

setting a plurality of the control parameters including a welding current supplied to said torch, a moving speed of said torch and an angle of said torch with respect to the workpieces to effect a result of the welding on the two workpieces;

imaging an area of said connecting line to obtain an image having a shape of a contour of said area where the welding has been performed and has left a molten pool that has subsequently solidified, and converting said image into electrical signals including data concerning conditions in said area;

extracting a plurality of data characteristic of said shape of said image from said electrical signals, said characteristic data being representative of results of the welding on said welding line;

comparing said extracted characteristic data with corresponding reference values representative of predetermined desired conditions of welding in said area, and detecting deviations between the characteristic data and the reference values; and changing said control parameters according to the detected deviations in a direction such that said characteristic data approaches said reference values.

6. A method for welding two workpieces together with a welding torch, comprising the steps of:

controlling the movement of a welding torch along a line connecting the two workpieces together in accordance with control parameters;

setting a plurality of the control parameters to effect the result of the welding on the two workpieces;

imaging an area of said connecting line to obtain a line image having a shape of a contour of said area where the welding has been performed and has left a molten pool that has subsequently solidified, said line image including portions that represent said characteristic data including a reinforcement, a throat depth, a right leg length, a left leg length, a right undercut, and a left undercut and converting said image into electrical signals including data concerning conditions in said area;

extracting a plurality of characteristic data of said shape of said image from said electrical signals, said characteristic data being representative of results of the welding on said welding line;

comparing said extracted characteristic data with corresponding reference values representative of predetermined desired conditions of welding in said area, and detecting deviations between the characteristic data and the reference values; and changing said control parameters according to the detected deviations in a direction such that said characteristic data approaches said reference values.

7. A method for sealing with a nozzle, comprising the steps of:

moving the nozzle along a predetermined route on a workpiece so as to eject sealing agent from the nozzle onto the workpiece according to control parameters;

setting a plurality of control parameters that affect the results of said sealing;

imaging an area of the work piece on said route where the sealing has been performed, and converting said image into electrical signals including data concerning conditions in said area;

extracting a plurality of characteristic data from said electrical signals, said characteristic data being representative of results of said sealing;

comparing said extracted characteristic data with corresponding reference values representative of predetermined desired conditions of said sealing, and detecting deviations between said extracted characteristic data and said reference values; and changing said control parameters according to detected deviations in a direction such that said characteristic data approaches said reference values.

8. A method of controlling work processing performed with a work processing apparatus, comprising the steps of:

performing predetermined work processing automatically with said work processing apparatus in accordance with control commands in a sequential fashion along a route on a surface of a work piece while said route is being determined;

imaging a first area of said surface where said work processing is being performed to determine said route for said work processing;

imaging a second area of said surface to obtain an image having a shape of a contour of said surface where said work has been performed and has subsequently stabilized, and converting said image into electrical signals including data concerning conditions in said second area;

alternately performing said imaging of said first and said second areas;

extracting a plurality of data characteristic of said shape of said image from said electrical signals, said characteristic data being representative of results of said work in said second area;

comparing said extracted characteristic data with corresponding reference values representative of desired and predetermined conditions of work in said second area, and detecting deviations between said extracted characteristic data and said corresponding reference values; and changing said control commands according to said detected deviations in a direction such that said characteristic data approaches said reference values.

9. A control apparatus for controlling a work processing apparatus, comprising:

means for sequentially moving a tool along a predetermined route set out on a surface of a workpiece and for performing said work processing according to control commands;

means for imaging an area of said surface to obtain a line image having a shape of a contour of said surface where the work has been performed and has subsequently stabilized and means for converting said line image into electrical signals including data concerning conditions in said area;

means for extracting a plurality of data characteristic of said shape of said line image from said electrical signals, said characteristic data being representative of results of said work on said work piece;

analyzing means for comparing said extracted characteristic data with corresponding references values representative of predetermined and desired conditions of work processing, and means for detecting deviations between said extracted characteristic data and said reference values; and control means for changing said control commands according to said detected deviations in a direction such that said characteristic data closely approaches said reference values.

10. An apparatus according to claim 9, wherein said tool is a welding torch, and said work processing apparatus is a manipulator of an industrial robot.

11. An apparatus according to claim 9, wherein said tool is a nozzle, and said work processing apparatus is a manipulator of an industrial robot.

12. An automatic welding apparatus, for welding at least two workpieces together along a welding line with a welding torch, comprising:

means for moving the welding torch along a welding line of two workpieces and for controlling said torch according to control parameters;

means for imaging an area of said welding line to obtain an image having a shape of a contour of said area where the welding has been performed and has left a molten pool that has subsequently solidified, and means for converting said image into electrical signals including data concerning conditions in said area;

means receiving said electrical signals for extracting a plurality of data characteristic of said image shape from said electrical signals, said characteristic data being representative of results of said welding along said welding line;

analyzing means receiving said extracted characteristic data for comparing said extracted characteristic data with corresponding reference values representative of desired and predetermined conditions of welding, including means for detecting and outputting, as deviation data, a deviation between said extracted characteristic data and said reference values; and control means receiving said deviation data and being connected to said torch moving and controlling means for changing said control parameters according to said detected deviation data in a direction such that said characteristic data closely approaches said reference values.

13. An automatic welding apparatus, for welding at least two workpieces together along a welding line with a welding torch, comprising:

means for moving the welding torch along a welding line of two workpieces and for controlling said torch according to control parameters;

means for imaging an area of said welding line to obtain an image having a shape of a contour of said area where the welding has been performed and has left a molten pool that has subsequently solidified, and means for converting said image into electrical signals including data concerning conditions in said area;

means receiving said electrical signals for extracting a plurality of data characteristic of said image shape from said electrical signals, including reinforcement data, throat depth data, right leg length data, left leg length data, right undercut data and left undercut data, said characteristic data being representative of results of said welding including a welding bead formation result formed by said torch along said welding line;

analyzing means receiving said extracted characteristic data for comparing said extracted characteristic data with corresponding reference values representative of desired and predetermined conditions of welding, including means for detecting and outputting, as deviation data, a deviation between said extracted characteristic data and said reference values; and control means receiving said deviation data and being connected to said torch moving and controlling means for changing said control parameters according to said detected deviation data in a direction such that said characteristic data closely approaches said reference values.

14. An automatic welding apparatus, for welding at least two workpieces together along a welding line with a welding torch, comprising:

means for moving the welding torch along a welding line of two workpieces and for controlling said torch according to control parameters;

means for imaging an area of said welding line to obtain an image having a shape of a contour of said area where the welding has been performed and has left a molten pool that has subsequently solidified, and means for converting said image into electrical signals including data concerning conditions in said area;

means receiving said electrical signals for extracting a plurality of data characteristic of said shape of said image shape from said electrical signals including throat depth data, said characteristic data being representative of results of said welding along said welding line, including said throat depth data being representative of a welding bead formed by the welding;

analyzing means receiving said extracted characteristic data for comparing said extracted characteristic data with corresponding reference values representative of desired and predetermined conditions of welding, including means for detecting and outputting, as deviation data, a deviation between said extracted characteristic data and said reference values; and control means receiving deviation data including throat depth deviation data as part of said deviation data and being connected to said torch moving and controlling means for changing said control parameters according to said detected deviation data in a direction such that said characteristic data closely approaches said reference values including changing a welding speed as one of said control parameters to lower the welding speed when said extracted throat depth data exceeds a predetermined one of said reference values and to increase the welding speed when the said extracted throat depth data is less than a predetermined one of said reference values, said predetermined reference value being a throat depth reference value.

15. An automatic welding apparatus for welding at least two workpieces together along a welding line with a welding torch, comprising:

means for moving the welding torch along a welding line of two workpieces and for controlling said torch according to control parameters;

means for imaging an area of said welding line to obtain an image having a shape of a contour of said area where the welding has been performed and has left a molten pool that has subsequently solidified and means for converting said image into electrical signals including data concerning conditions in said area;

means receiving said electrical signals for extracting a plurality of data characteristic of said image shape from said electrical signals including left and right leg length data, said characteristic data being representative of results of said welding along said welding line including said left and right leg data being representative of a welding bead formed by the welding;

analyzing means receiving said extracted characteristic data for comparing said extracted characteristic data with corresponding reference values representative of desired and predetermined conditions of welding, and for calculating an average leg length data value including means for detecting and outputting, as deviation data, a deviation between said extracted characteristic data and said reference values; and control means receiving said deviation data and being connected to said torch moving and controlling means for changing said control parameters according to said detected deviation data in a direction such that said characteristic data closely approaches said reference values including said control means receiving average leg length deviation data as part of said deviation data and changing a welding speed as one of said control parameters to increase the welding speed when said average leg length data exceeds a predetermined one of said reference values and to decrease the welding speed when said average leg length data is less than a predetermined one of said reference values, said predetermined reference value being an average leg length value.

16. An automatic welding apparatus according to claim 15, wherein said control means shifts a target position of said welding torch to equalize the length of said right and left legs.

17. An automatic welding apparatus, for welding at least two workpieces together along a welding line with a welding torch, comprising:

means for moving the welding torch along a welding line of two workpieces and for controlling said torch according to control parameters;

means for imaging an area of said welding line to obtain an image having a shape of a contour of said area where the welding has been performed and has left a molten pool that has subsequently solidified and means for converting said image into electrical signals including data concerning conditions in said area;

means receiving said electrical signals for extracting a plurality of data characteristic of said image shape from said electrical signals including overlap data, said characteristic data being representative of results of said welding along said welding line;

analyzing means receiving said extracted characteristic data for comparing said extracted characteristic data with corresponding reference values representative of desired and predetermined conditions of welding, including means for detecting and outputting, as deviation data, a deviation between said extracted characteristic data and said reference values; and control means receiving said deviation data and being connected to said torch moving and controlling means for changing said control parameters according to said detected deviation data in a direction such that said characteristic data closely approaches said reference values including increasing a welding voltage when the overlap exceeds a predetermined one of said reference values.

18. A control apparatus for controlling a work processing apparatus, comprising:

means for sequentially moving a tool along a route on a surface of a work piece while said route is being determined and for controlling work performed on said work piece according to control commands;

first imaging means for forming a first image on a first area of said surface where said work will be performed so as to determine said route;

second imaging means for forming a second image on a second area of said surface having a shape of a contour of said surface where said work has already been performed and has subsequently stabilized, and means for converting said second image into electrical signals including data concerning conditions in said second area;

first control means for controlling said first and second imaging means to form said first and second images alternately;

means receiving said electrical signals for extracting a plurality of data characteristic of said shape of said second image from said electrical signals, said characteristic data being representative of results of said work on said work piece;

analyzing means receiving said characteristic data for comparing said characteristic data with corresponding reference values representing predetermined and desired conditions of work, and means for detecting and outputting deviation data representing deviation values between said characteristic data and said corresponding reference values; and control means connected to said tool moving and work controlling means for changing said control commands according to said detected deviation data in a direction such that said characteristic data closely approaches said reference values.

* * * * *